United States Patent [19]

Mazaris

[11] Patent Number: 5,892,177
[45] Date of Patent: Apr. 6, 1999

[54] HINGED CABLE ROUTING APPARATUS

[76] Inventor: Dennis W. Mazaris, 813 Mosby Hollow Dr., Herndon, Va. 22070

[21] Appl. No.: 861,531

[22] Filed: May 22, 1997

[51] Int. Cl.[6] ........................................ H01B 7/00
[52] U.S. Cl. ............................... 174/135; 29/857
[58] Field of Search ..................... 174/135, 112, 174/72 A, 69; D8/356; 248/74.2; 29/857

[56] References Cited

U.S. PATENT DOCUMENTS

| | | | |
|---|---|---|---|
| 3,219,765 | 11/1965 | Pless | 174/135 |
| 4,424,627 | 1/1984 | Tarbox | 174/135 |
| 4,992,629 | 2/1991 | Morais | 174/69 |
| 5,280,866 | 1/1994 | Ueki | 248/74.2 |
| 5,589,667 | 12/1996 | Tsukazaki et al. | 174/135 |

FOREIGN PATENT DOCUMENTS

| | | | |
|---|---|---|---|
| 722128 | 12/1951 | United Kingdom | 174/135 |

*Primary Examiner*—Nestor Ramirez
*Assistant Examiner*—Joseph Waks
*Attorney, Agent, or Firm*—Rodger H. Flagg

[57] ABSTRACT

Two opposing hinged cable routing assemblies each have a base portion and a hinged strap portion. The hinged strap portion is releasably secured to the base portion to releasably secure multiple cables therein. The cable is bent about the radiused end portion, to reduce the stress on the bent cable and to avoid damage to the radiused cable. The excess cable is taken up between the opposing cable routing assemblies. A score line is provided on the base portion adjacent to the radiused end portion, to provide a break-away radiused end portion. An intermediate cable routing apparatus may be formed of a flexible coiled wrap portion, or a flexible spiral wrap portion. The cable routing apparatus may be marked with indicia to identify a selected cable.

16 Claims, 3 Drawing Sheets

HINGED CABLE ROUTING APPARATUS

This patent application relates to a co-pending patent application entitled: SEPARABLE CABLE ROUTING APPARATUS by Dennis Mazaris, filed May 22, 1997.

BACKGROUND OF THE INVENTION

DEFINITIONS: For purposes of this invention, the term "cable" is intended to include electrical cable, insulated electric wire, uninsulated electric wire, twisted wire cable, fiber optic cable, plastic cable, and all cable conforming to the "Commercial Building telecommunications Cabling Standard TIA/EIA-586-A and ISO/IEC 11801, which is incorporated by reference herein.

Cable routing is a problem where cable is pre-assembled, and excess cable length has been provided to assure sufficient length for connection of a plurality of cable to a fixed location. Where numerous cables are connected to a fixed location, the excess length of each of the cables becomes a problem, creating a "rat's nest" of tangled cable, which is difficult to work with, and may create a safety hazard where emergency repairs are quickly needed.

U.S. Pat. No. 3,520,988 issuing to Ralph Ballock on Jul. 21, 1970 discloses a cable support for temporarily reducing the overall length and to eliminate tangled excess lengths.

U.S. Pat. No. 4,475,649 issuing to Willem Haarbosch on Oct. 9, 1984, discloses a storage case for an electric cord.

U.S. Pat. No. 5,168,128 issuing to Alan Thomsen on Dec. 1, 1992, discloses an anti-tangle spaced stiffener for elongated flexible members, to prevent tangling and for folding the elongated flexible member into a compact storage relationship.

U.S. Pat. No. 5,144,100 issuing to Gregory Andel on Sep. 1, 1992 discloses a wire separator apparatus having a cover flap and parallel mounting flanges.

SUMMARY OF THE INVENTION

The hinged cable routing apparatus disclosed herein, comprises a base portion having a strap portion which is hinged along a first side of the base portion. The strap portion has a catch with at least one tab which engages the second side of the base portion to secure at least two cable portions therein. The base portion further has a tapered, radiused end portion, which serves to support the cable when the cable is bent about the radiused end portion, thus reducing the stress on the bent cable and preventing the cable from being kinked.

A score line may extend between the first and second sides of the base portion between the radiused end portion and the strap portion, enabling the user to break off the radiused end portion, to utilize the remaining portion of the cable routing apparatus as an intermediate cable routing apparatus.

Alternately, the intermediate cable routing apparatus may comprise a flexible coiled wrap portion or a flexible spiral wrap portion to retain two or more cable portions together at a location between the opposing radiused end portions.

The hinged cable routing apparatus may be marked with indicia, such as color coding, symbols, letters or numerals, to identify the cable routed within the cable routing apparatus, for ease of identifying and locating a specific cable.

DESCRIPTION OF THE PREFERRED EMBODIMENTS

Figure 1:
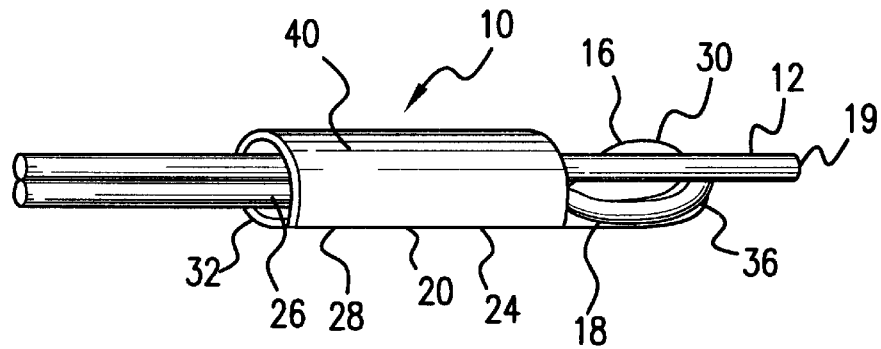
FIG. 1 is a perspective view of the hinged cable routing apparatus used to reduce the cable length about a fixed location.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows a plurality of hinged cable routing apparatus 10 used to organize a plurality of cable 12 nested about a fixed location (not shown), such as a patch panel or terminal box. The cable 12 may be any selected size of insulated or uninsulated electrical wire, fiber optic cable, or plastic cable, and includes all cable conforming to the "Commercial Building Telecommunications Cabling Standards", published as TIA/EIA-568-A and ISO/IEC 11801, which are incorporated by reference herein.

Various sizes of cable mounting apparatus 10 may be provided to suit various sizes of cable diameters, in accordance with the intended use of the user. The hinged cable mounting apparatus 10 is preferably made of a non-conductive material, such as plastic.

The hinged cable mounting apparatus 10 is preferably molded as one piece, with a living hinge joining the base portion and the strap portion. This provides advantages of low-cost, ease of storage and handling, and may be assembled upon cable 12 without the need for hand or power tools.

Figure 5:
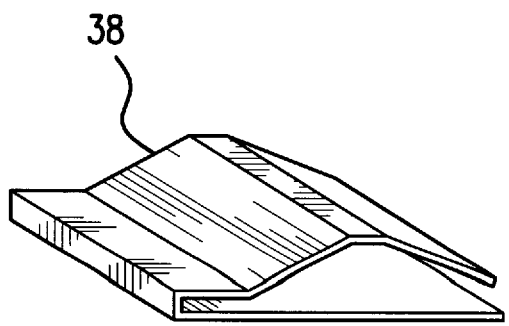
FIG. 5 is a perspective view of a clip used to secure smaller cable within the hinged cable routing apparatus.

A clip 38, as shown in FIG. 5, may be inserted upon several cable portions 16, 18, 19 to aid in securing several smaller cable 12 portions together. The clip 38 is preferably made of a resilient, non-conductive material, such as plastic.

As shown in FIG. 1 through FIG. 4B, the hinged cable routing apparatus 10 comprises a base portion 20, having a first side 22 and a second side 24, a top side 26 and a bottom side 28. The base portion 20 includes a radiused end portion 30 and an opposite end portion 32.

Preferably, the radiused end portion 30 is tapered 34 as shown in FIG. 5. The radiused end portion 30 provides support for the cable 12 as it is routed approximately 180 degrees about the radiused end portion 30, substantially relieving stress on the bent portion 36 of the cable 12, and by not allowing the cable 12 to kink as it is radiused about the radiused end portion 30. This enables the user to compactly route the cable 12 to take up excess slack in the preassembled cable 12, without damage to the cable 12, and still maintaining electrical or optical performance compliant to standards.

Figure 2:
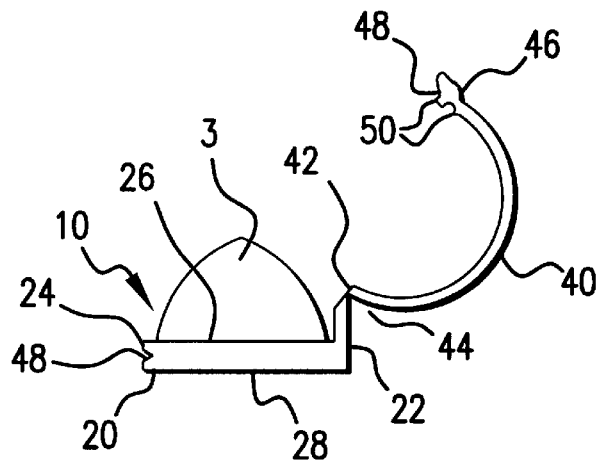
FIG. 2 is an elevation view of the hinged cable routing apparatus, with the strap portion positioned in an open position.
Figure 3:
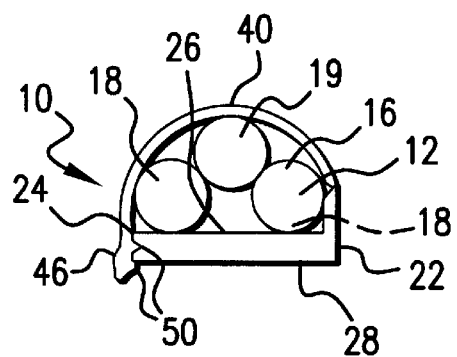
FIG. 3 is an elevation view of the hinged cable routing apparatus, with the strap portion closed about three cables.

One side 44 of a strap portion 40 is hingedly connected 42 to the first side 22 of the base portion 20, enabling the strap portion 40 to move between the open position shown in FIG. 2, and the closed position shown in FIG. 3. The strap portion 40 may be in the form of an inverted U-shape, or may be flexible to conform to the shape of the cable routed within the hinged cable routing apparatus 10, to suit design and manufacturing preference.

The opposite side 46 of the strap portion 40 contains at least one catch 48 positioned to engage and secure the strap portion 40 to the second side 24 of the base portion 20. The catch 48 may have multiple engaging tabs 50 positioned to adjustably engage the second side portion 20 of the cable routing apparatus 10. Alternately, the second side of the base portion 20 may have a multiple tabs 50 positioned to engage a suitably positioned catch 48 located on the strap portion 40.

In this way, the strap portion 40 may be adjustably secured to the base portion 20 to provide a snug fit about the cable 12 enclosed within the hinged cable routing apparatus 10. A single hinged cable routing apparatus 10 may be used to secure a variety of cable 12 diameters, eliminating the need to manufacture, stock and carry a variety of hinged cable routing apparatus 10 sizes to suit most preassembled cable 12 used in a selected fixed location (not shown).

The hinged cable routing apparatus 10 may be quickly assembled about the cable 12 in proximity to a fixed location, such as a patch panel or terminal box, thus eliminating excess cable 12 slack. The cable 12 may be organized in a manner to easily locate, identify and change, repair or add cable 12 to a selected fixed location.

The strap portion 40 is opened by disengaging the tab 48 from the second side 24 of the base portion 20, as shown in FIG. 2, to receive a first cable portion 16 adjacent to the top side 26 of the base portion 20 of the cable routing apparatus 10.

The cable 12 is bent approximately 180 degrees around the radiused end portion 30 of the hinged cable routing apparatus 10, to align a second cable portion 18 of the cable 12 adjacent to the first cable portion 16. A third cable portion 19 may also be secured within the hinged cable routing apparatus 10.

The strap portion 40 is then closed over the first, second and third cable portions 16, 18, 19 securing the cables between the strap portion 40 and the top side 26 of the base portion 20, with a portion of the cable 12 supported about the radiused end portion 30.

The tab 50 on catch 48 located on the opposite side 46 of the strap portion 40 engages the catch 48 on the second side 24 of the base portion 20 to secure the first, second and third cable portions 16, 18, 19 therebetween. More than one tab 50 may be positioned in spaced parallel relation on the opposite side 46 of the strap portion 40, to provide multiple selective securement positions to accommodate various sized cable 12. As previously noted, multiple tabs 50 may be located upon the second side 24 of the base portion 20, and a catch 24 positioned upon the second side 46 of the strap portion 40 to adjustably engage one of the multiple tabs 50.

Figure 6:
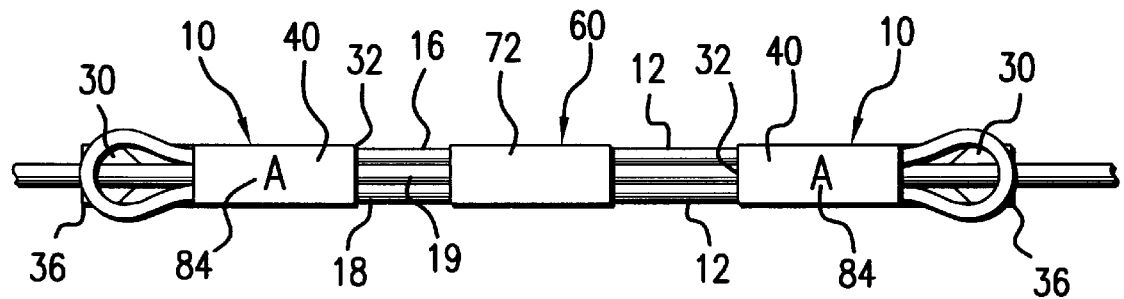
FIG. 6 is a plan view of opposing hinged cable routing apparatus installed upon a cable, with an intermediate cable routing apparatus positioned in spaced relation between the opposing cable routing apparatus.

As shown in FIG. 6 a second, opposing hinged cable mounting apparatus 10 may be used to direct the cable 12 back towards the first hinged cable mounting apparatus 10, to gather up the excess cable 12 in proximity to the fixed cable connection location, or at any other convenient location along the pre-assembled cable 12. When opposing, hinged cable mounting apparatus 10 are used, the hinged cable mounting apparatus 10 is adapted to receive a third cable portion 19, as shown in FIG. 3.

The excess cable slack is preferably formed into a loop, and a first hinged cable mounting apparatus 10 is secured about one end of the loop. A second, opposing hinged cable mounting apparatus 10 is then used to direct the cable 12 back towards the first separable cable mounting apparatus 10, to gather up the excess cable 12 in proximity to the fixed cable connection location, or at any other convenient location along the preassembled cable 12.

Once the hinged cable mounting apparatus 10 is loosely installed on the excess cable 12, the hinged cable mounting apparatus 10 may be adjustably, slidably positioned along the excess cable 12, and locked in position by compressing the resilient strap portion 40 against the base portion 20.

Figure 7:
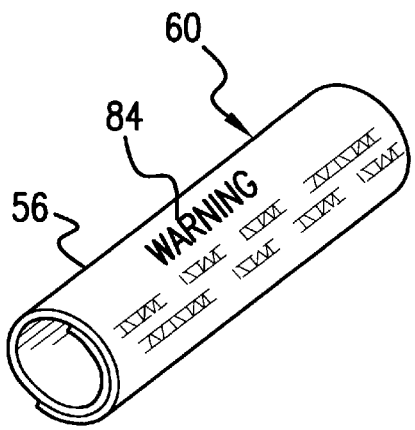
FIG. 7 is a perspective view of a flexible coiled wrap portion adapted for use as an intermediate cable routing apparatus.
Figure 8:
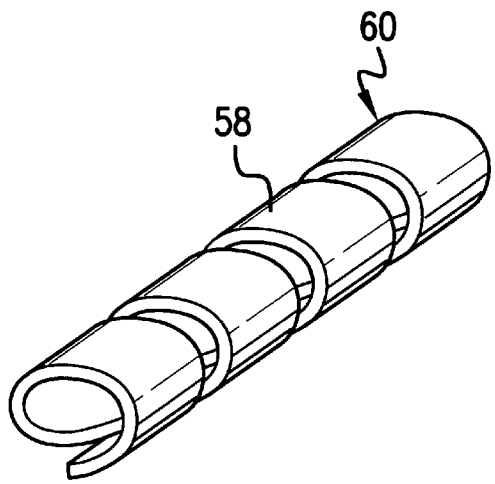
FIG. 8 is a perspective view of a flexible spiral wrap portion used to secure multiple cable together between the opposing radiused, hinged cable routing apparatus.

In this way, excess preassembled cable 12 may be routed to take up the excess slack, and provide neat and organized cable 12 routing at a selected fixed location to accommodate the orderly connection of a plurality of preassembled cables 12, as shown in FIG. 6.

Where opposing hinged cable routing apparatus 10 are spaced sufficiently apart, one or more intermediate cable routing apparatus 60 may be used to provide additional control of the cable 12. The intermediate cable routing apparatus 60 may be in the form of a flexible coiled wrap 56 made from a precoiled plastic, as shown in FIG. 7; or a flexible spiral wrap 58 made of a spiral wound plastic, as shown in FIG. 8.

Preferably, the hinged intermediate cable routing apparatus is made from plastic which is from one to six inches long and from 0.010 to 0.093 thick.

Figure 9:
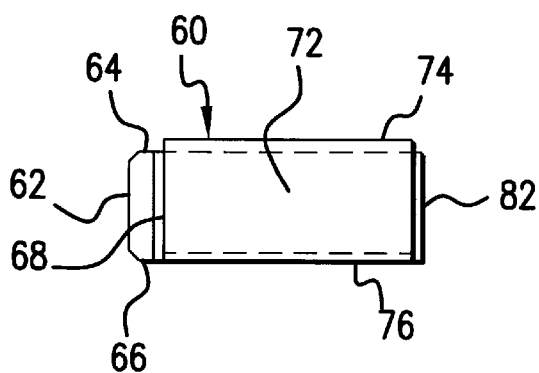
FIG. 9 is a plan view of an intermediate cable routing apparatus wherein the radiused end portion has been snapped away at the score line shown in FIG. 4A.

The hinged intermediate cable mounting apparatus 60 shown in FIG. 9, preferably comprises a base portion 62 having a first side 64, a second side 66, a top side 68 and a bottom side similar to bottom side 28. One side 74 of the strap portion 72 is hingedly connected to the first side 64 of the base portion 62. The opposite side 76 of the strap portion 72 includes at least one catch 78 similar to catch 48 having at least one engaging tab 80 similar to tab 50. The tab 80 is positioned to enclose the cable 12 between the strap portion 72 and the base portion 62, but unlike the hinged cable routing apparatus 10 previously disclosed, there is no radiused end portion 30 required on the intermediate cable mounting apparatus 60.

Figure 4A:
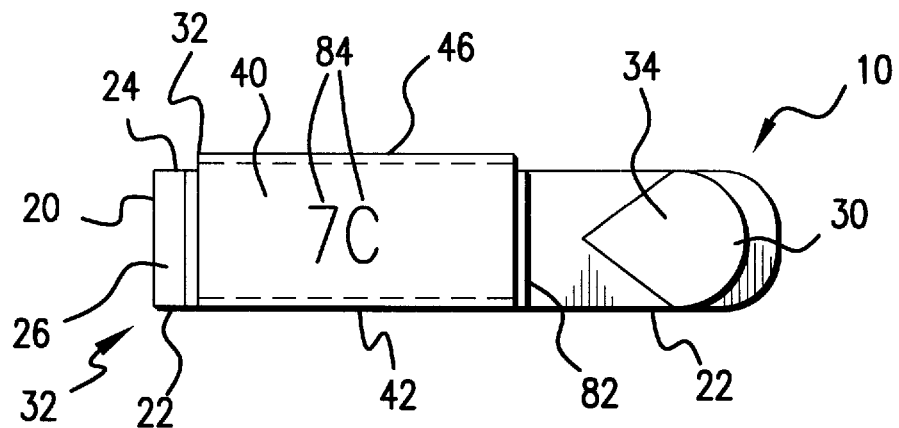
FIG. 4A is a plan view of the hinged cable routing apparatus shown in FIG. 1.
Figure 4B:
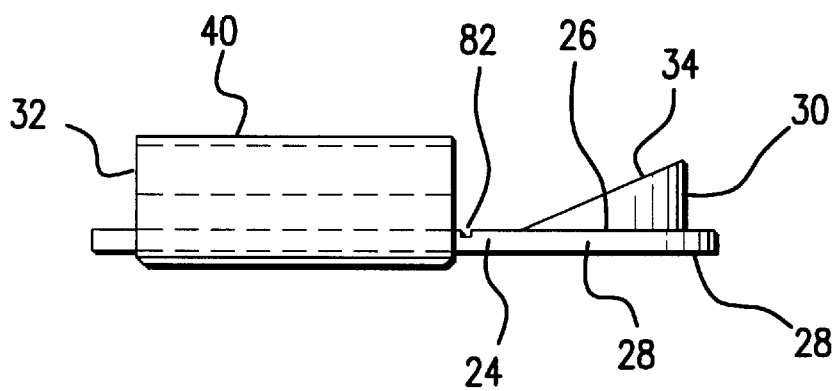
FIG. 4B is an elevation view of the hinged cable routing apparatus shown in FIG. 4A.

In order to eliminate the need for stocking both the radiused, hinged cable routing apparatus 10 and the intermediate cable mounting apparatus 60, a score line 82 may be provided across the base portion 20 of the hinged cable mounting apparatus 10 between the strap portion 40 and the inclined, radiused end portion 30, as shown in FIG. 4A and FIG. 4B. The score line 82 may be on either the top or bottom side 26, 28 of the base portion 20, and is shown on the top side in FIG. 4A.

Thus, the radiused end portion 30 may be snapped off from the remainder of the base-portion 20 by forcibly bending the hinged cable routing apparatus 10 at the score line 82, to convert a radiused, hinged cable mounting apparatus 10 into an intermediate cable mounting apparatus 60.

The hinged cable mounting apparatus 10 disclosed herein, may be readily adapted for use both for the radiused bending of cable 12 and for the intermediate connection of cable 12, as shown in FIG. 6. Alternately, the intermediate cable mounting apparatus 60 may be in the form of a flexible coil wrap portion 56 shown in FIG. 7; or the intermediate cable mounting apparatus 60 may be a flexible spiral wrap portion 58, as shown in FIG. 8, in accordance with manufacturing or user preference.

The multiple engaging tabs 50 and catch 48 enable the user to selectively position first and second cable portions 16, 18, or first, second and third cable portions 16, 18, 19 within the cable routing apparatus 10. This is also true for intermediate cable routing apparatus 60.

Where cable 12 is in need of repair, relocation or replacement, the hinged cable routing apparatus 10 disclosed herein may be easily removed from the cable 12 by disengaging the tab 50 from the catch 48 located on the second side 24 of the base portion 20. Once removed, the hinged cable routing apparatus 10 may be reused as needed.

Thus, the hinged cable routing apparatus 10 disclosed herein, is adaptable for use with a variety of cable sizes and quantity of cable 12, is adaptable for use with a radiused end portion 30 to compactly route cable 12 approximately 180 degrees to reverse direction, as needed to reduce or eliminate slack cable 12. The hinged cable routing apparatus 10 may also be adapted for use as an intermediate cable routing apparatus 60, to organize and retain preassembled cable 12 at a fixed location.

The hinged cable routing apparatus 10 may include indicia 84, such as symbols, letters, numerals, color coding, bar coding, or an icon 88 for ease of identifying the cable 12 retained within the cable routing apparatus 10. The indicia 84 may be used for instruction or as a warning to suit selected conditions.

A slot 86 may be provided in the base portion 20 to receive a removable icon 88 having indicia 84 thereon. Preferably, the slot 86 is located upon the tapered portion 34 of the radiused end portion 30 of the base 20 as shown in FIG. 4A and 4B. The removable icon 88 enables the user to move the cable identifying indicia 84 located upon the removable icon 88, when cable 12 is moved, providing reusable indicia 84 adaptable for use on any new or existing hinged cable routing apparatus 10. The indicia 84 is preferably located on at least one portion of the base portion 20 and/or the strap portion 40, or upon the removable icon 88.

While this invention has been described with reference to a particular embodiment, it is to be understood that modifications and adaptations may be made to this invention without departing from the spirit of the invention or from the scope of the following claims.

INDUSTRIAL APPLICABILITY

The hinged cable routing apparatus 10 disclosed herein is directed for use in organizing and retaining a plurality of preassembled cable 12 located at a fixed location, such as a patch panel or terminal box.

What is claimed is:

1. A hinged cable routing apparatus, comprising:
 a) a base portion having a first base side, a second base side, a top base side and a bottom base side, the base portion further having a radiused end portion raised and tapered above the base portion and an opposite end portion; and
 b) a strap portion having a first strap side and a second strap side, said strap portion flexibly secured at said first strap side to the first base side of the base portion, the second strap side of the strap portion having a catch with at least one tab positioned to engage the second base side of the base portion, the strap portion forming an open ended enclosure between the strap portion and the base portion, and wherein a cable portion is radiused in a loop about said radiused end portion and releasably secured by the hinged cable mounting apparatus to take up a cable slack.

2. The hinged cable routing apparatus of claim 1, wherein said catch having at least one tab comprises multiple tabs positioned upon the catch in a spaced parallel alignment to releasably engage the second base side to provide a selective adjustment of the strap portion about the cable retained within the hinged cable routing apparatus.

3. The hinged cable routing apparatus of claim 1, wherein the cable routing apparatus is molded in one piece, from a non-conductive plastic material, to form a living hinge between the first base side of the base portion and the first strap side of the strap portion.

4. The hinged cable routing apparatus of claim 1, wherein a score line is provided across the base portion from the first base side to the second base side, adjacent to the radiused end portion, to provide a break-away radiused end portion, wherein the remaining hinged cable routing apparatus may be used as an intermediate cable routing apparatus.

5. The hinged cable routing apparatus of claim 1, wherein indicia are located upon the strap portion or the base portion of the hinged cable routing apparatus.

6. The hinged cable routing apparatus of claim 1, wherein the first strap side of the flexibly secured strap portion, is secured to the first base side of the base portion in the form of a flexible hinge having a reduced material thickness extending along the first base side of the base portion.

7. The hinged cable routing apparatus of claim 1, wherein the base portion has a slot sized to receive a removable icon therein, the icon having selected indicia thereon.

8. The hinged cable routing apparatus of claim 1, wherein the strap portion comprises a generally resilient, inverted U-shaped portion with said first strap end of the U-shaped portion hingedly connected to the first base side of the base portion, and wherein said catch is formed on the opposite end of the U-shaped portion, said catch having said at least one tab positioned to be releasably secured to the second base side of the base portion.

9. The hinged cable routing apparatus of claim 8, wherein multiple tabs are positioned in a spaced parallel alignment upon the second base side of the base portion, and said catch is positioned on the strap portion to selectively engage and releasably secure the strap portion to at least one of the multiple tabs located on the second base side of the base portion.

10. A hinged cable routing apparatus, which comprises:
 a) a base portion having a first base side, a second base side with multiple tabs positioned in spaced relation thereon, a top side and a bottom side, the base portion further having a raised and tapered radiused end portion raised and tapered above the base portion, and a non-radiused end portion; and
 b) a strap portion flexibly secured on a first strap side to the first base side of the base portion, a second strap side of the strap portion having at least one catch positioned to selectively engage one of the multiple tabs located on the second base side of the base portion, forming a selectively positioned open ended enclosure between the strap portion and the base portion, and wherein a cable portion is radiused in a loop about said radiused end portion and releasably secured by the hinged cable mounting apparatus to take up a cable slack.

11. The hinged cable routing apparatus of claim 10, wherein a score line is provided across the base portion from the first base side to the second base side along at least one of the top and bottom sides, adjacent to the radiused end portion, to provide a break-away radiused end portion.

12. The hinged cable routing apparatus of claim 10, wherein indicia are located upon at least one of the strap portion and the base portion of the hinged cable routing apparatus.

13. The hinged cable routing apparatus of claim 10, wherein the flexibly secured strap portion is secured to the first base side of the base portion by a flexible hinge having a reduced material thickness extending along the first base side of the base portion.

14. A hinged cable routing apparatus, which comprises:
A) a first, a second and a third hinged cable routing apparatus, each having a base portion, a first base side, a second base side, a top side and a bottom side, the base portion further having a raised and tapered radiused end portion and a non-radiused end portion; the first, second and third hinged cable routing apparatus further each having a strap portion with a first strap side of the strap portion flexibly secured to the first base side of the base portion, and a second strap side of the strap portion having a at least one catch positioned to engage at least one tab positioned on the second base side of the base portion, thus forming a selectively positioned open ended enclosure between the strap portion and the top side of the base portion; and B) said third hinged cable routing apparatus positioned in spaced relation between opposing first and second radiused cable mounting apparatus, the third hinged cable routing apparatus having a score line extending between the first and second base sides of the base portion, on at least one of the top and bottom sides of the base portion, adjacent to the radiused end portion, and wherein the radiused end portion of the third hinged cable routing apparatus is snapped at the score line to remove the radiused end portion from the strap portion, thus forming an intermediate cable routing apparatus from the third hinged cable routing apparatus.

15. The hinged cable routing apparatus of claim 14, wherein the intermediate cable routing apparatus comprises a flexible coiled wrap portion.

16. The hinged cable routing apparatus of claim 14, wherein the intermediate cable routing apparatus comprises a flexible spiral wrap portion.

\* \* \* \* \*